US011044447B2

(12) United States Patent
Xiao et al.

(10) Patent No.: US 11,044,447 B2
(45) Date of Patent: Jun. 22, 2021

(54) PROJECTION DISPLAY SYSTEM, CONTROLLING METHOD THEREOF, AND PROJECTION DISPLAY DEVICE

(71) Applicant: HISENSE LASER DISPLAY CO., LTD., Shandong (CN)

(72) Inventors: Jichen Xiao, Shandong (CN); Chao Wu, Shandong (CN)

(73) Assignee: HISENSE LASER DISPLAY CO., LTD., Shandong (CN)

( * ) Notice: Subject to any disclaimer, the term of this patent is extended or adjusted under 35 U.S.C. 154(b) by 0 days.

(21) Appl. No.: 15/931,955

(22) Filed: May 14, 2020

(65) Prior Publication Data

US 2021/0092338 A1 Mar. 25, 2021

Related U.S. Application Data

(63) Continuation-in-part of application No. PCT/CN2020/086588, filed on Apr. 24, 2020.

(30) Foreign Application Priority Data

Sep. 20, 2019 (CN) ........................ 201910892459.X

(51) Int. Cl.
*H04N 9/31* (2006.01)

(52) U.S. Cl.
CPC ......... *H04N 9/3188* (2013.01); *H04N 9/3105* (2013.01); *H04N 9/3152* (2013.01)

(58) Field of Classification Search
CPC ... H04N 9/3188; H04N 9/3105; H04N 9/3152
See application file for complete search history.

(56) References Cited

U.S. PATENT DOCUMENTS 7,358,930 B2 * 4/2008 Childers .............. H04N 9/3117 345/32
9,354,494 B2 * 5/2016 Mashitani ............ G03B 21/142
(Continued)

FOREIGN PATENT DOCUMENTS

CN 1671198 A 9/2005
CN 1898969 A 1/2007
(Continued)

OTHER PUBLICATIONS

International Search Report and Written Opinion issued in corresponding International Application No. PCT/CN2020/086588 dated Jul. 16, 2020, with English translation.

*Primary Examiner* — Brian P Yenke
(74) *Attorney, Agent, or Firm* — Morgan, Lewis & Bockius LLP

(57) ABSTRACT

A projection display system includes a control assembly, an optical path changing device, a light source assembly, a digital micromirror device, and a projection lens. The control assembly is configured to determine whether a resolution of an image to be projected is greater than a preset resolution. If the resolution of the image to be projected is greater than the preset resolution, the control assembly divides the image to be projected into N sub-images, wherein N is greater than or equal to 2. For each sub-image: the control assembly is further configured to determine a first signal, a second signal, and a third signal according to the sub-image, send the first signal to the light source assembly, send the second signal to the digital micromirror device, and send the third signal to the optical path changing device. The projection lens is configured to project the N sub-images at different times.

16 Claims, 8 Drawing Sheets

(56) References Cited

U.S. PATENT DOCUMENTS 9,743,056 B2* 8/2017 Guo ..................... H04N 9/3188
10,091,477 B2* 10/2018 Yamaguchi ............ H04N 9/312
10,205,923 B2* 2/2019 Xiao .................... H04N 9/3141
10,284,827 B2* 5/2019 Xiao .................... H04N 9/3114
10,291,891 B2* 5/2019 Chen ......................... G01J 5/10
10,311,548 B2* 6/2019 Burch ................... G06T 3/4092
10,460,637 B2* 10/2019 Ohkoba ................. G09G 3/003
10,554,940 B1* 2/2020 Ghazaryan ........... H04N 9/3105
10,780,640 B2* 9/2020 Wynne .................. B29C 64/277
10,904,495 B2* 1/2021 Pertierra .............. H04N 9/3194
2005/0134805 A1 6/2005 Conner et al.
2006/0023065 A1* 2/2006 Alden .................. H04N 21/816 348/51
2006/0029252 A1* 2/2006 So ........................ H04N 19/105 382/100
2008/0068402 A1* 3/2008 Ioka ..................... G09G 3/2088 345/660
2008/0284763 A1* 11/2008 Someya ................. G09G 3/007 345/204
2009/0009730 A1* 1/2009 Destain .................. G03B 21/28 353/84
2016/0327783 A1* 11/2016 Xu ....................... H04N 9/3155
2017/0019648 A1* 1/2017 Yamaguchi .......... H04N 7/0132
2017/0187998 A1 6/2017 Xiao et al.
2018/0192013 A1* 7/2018 Kato .................... G09G 3/2037
2018/0196335 A1* 7/2018 Kato .................... H04N 9/3182
2018/0205920 A1* 7/2018 Wu .................. H04N 21/42204
2019/0049824 A1* 2/2019 Yamamoto ........... H04N 9/3102
2019/0297309 A1* 9/2019 Chiu .................... H04N 9/3182

FOREIGN PATENT DOCUMENTS

CN 104614929 A 5/2015
CN 106507075 A 3/2017
CN 108074512 A 5/2018
CN 110602470 A 12/2019

* cited by examiner

PROJECTION DISPLAY SYSTEM, CONTROLLING METHOD THEREOF, AND PROJECTION DISPLAY DEVICE

CROSS-REFERENCE TO RELATED APPLICATIONS

This application is a Bypass Continuation-in-Part Application of PCT/CN2020/086588 filed Apr. 24, 2020, which claims priority to Chinese Patent Application No. 201910892459.X filed Sep. 20, 2019, which are incorporated herein by reference in their entirety.

TECHNICAL FIELD

Embodiments of the present disclosure relates to a projection display system, a controlling method thereof, and a projection display device.

BACKGROUND

At present, the resolution of a projection display system is determined by the number of micromirrors included in a digital micromirror device (DMD), and each micromirror may correspond to one pixel in an image to be projected.

SUMMARY

In one aspect, a projection display system is provided. The projection display system includes a control assembly, a light source assembly, a digital micromirror device, an optical path changing device and a projection lens. The control assembly is configured to: determine whether a resolution of an image to be projected is greater than a preset resolution; and divide the image to be projected into N sub-images in response to a determination that the resolution of the image to be projected is greater than the preset resolution, where N is an integer greater than or equal to 2. For each frame of sub-image, the control assembly is further configured to determine a light source control signal, a digital micromirror signal, and an optical path changing signal according to the sub-image, send the light source control signal to the light source assembly, send the digital micromirror signal to the digital micromirror device, and send the optical path changing signal to the optical path changing device; the light source assembly is configured to sequentially emit light of a plurality of primary colors to the digital micromirror device based on a timing indicated by the light source control signal; the digital micromirror device is configured to reflect at least a portion of the light of the plurality of primary colors toward the optical path changing device according to the digital micromirror signal; the optical path changing device is configured to rotate under control of the optical path changing signal, so that light reflected by the digital micromirror device to the optical path changing device is directed to the projection lens. The projection lens is configured to project the N sub-images at different times.

In another aspect, a controlling method of the projection display system is provided. The projection display system includes an optical path changing device, a light source assembly, a digital micromirror device, a control assembly and a projection lens. The controlling method includes: determining, by the control assembly, whether a resolution of the image to be projected is greater than a preset resolution; dividing, by the control assembly, the image to be projected into N sub-images in response to a determination that the resolution of the image to be projected is greater than the preset resolution, wherein N is an integer greater than or equal to 2; for each frame of sub-image: determining, by the control assembly, a light source control signal, a digital micromirror signal, and an optical path changing signal according to the sub-image; sending, by the control assembly, the light source control signal to the light source assembly to control a timing of the light source assembly to emit light of a plurality of primary colors to the digital micromirror device; sending, by the control assembly, the digital micromirror signal to the digital micromirror device to control a plurality of micromirrors in the digital micromirror device to rotate, so that the digital micromirror device reflects at least a portion of the light of the plurality of primary colors toward the optical path changing device, and sending, by the control assembly, the optical path changing signal to the optical path changing device to control the optical path changing device to rotate, so that the optical path changing device directs light reflected by the digital micromirror device toward the projection lens.

In yet another aspect, a projection display device is provided. The projection display device includes a communication interface configured to receive an image to be projected and a processor configured to execute one or more steps in the controlling method of the projection display system.

In yet another aspect, a non-transitory computer-readable storage medium is provided. The computer-readable storage medium stores computer program instructions that, when executed by a computer, cause the computer to perform one or more steps in the controlling method of the projection display system as described above.

BRIEF DESCRIPTION OF THE DRAWINGS

In order to describe technical solutions in embodiments of the present disclosure more clearly, the accompanying drawings used in the description of embodiments will be introduced briefly below. Obviously, the accompanying drawings to be described below are merely some embodiments of the present disclosure, and a person of ordinary skill in the art may obtain other drawings according to these drawings. In addition, the drawings in the following description may be regarded as schematic diagrams, and are not intended to limit the actual size of the product, the actual process of the method, the actual timing of the signals, etc., involved in the embodiments of the present disclosure.

DETAILED DESCRIPTION

Figure 1:
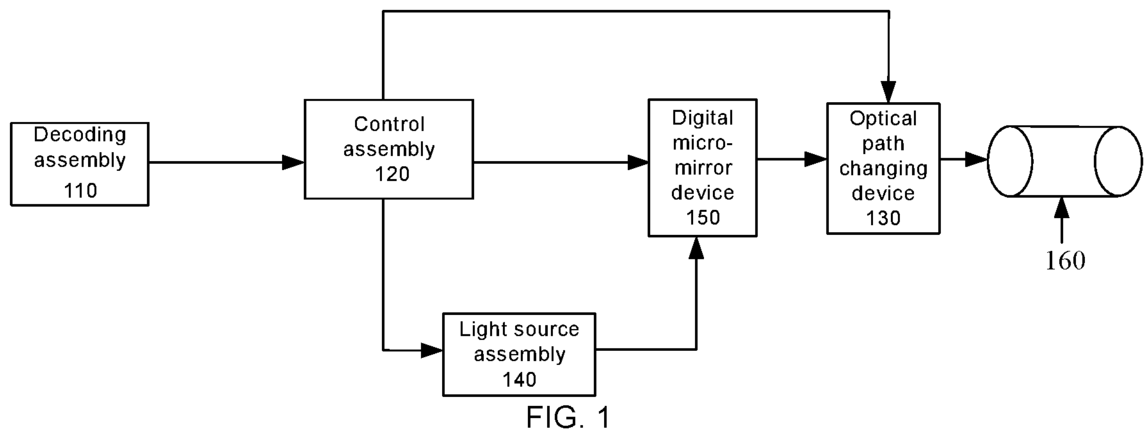
FIG. 1 is a block diagram of a projection display system, in accordance with some embodiments.

Some embodiments of the present disclosure will be described below with reference to the accompanying drawings. Obviously, the described embodiments are merely some but not all of embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the terms "comprise" and other forms thereof, such as the third-person singular forms "comprises" and the present participle form "comprising", are to be construed in an open, inclusive sense, that is as "including, but not limited to".

In the description and the claims, terms other than those expressly stated may have nuanced meanings implied in the context. Similarly, phrase "in one embodiment" or "in some embodiments" does not necessarily refer to same embodiment(s), and phrase "in another embodiment" or "in some other embodiments" does not necessarily refer to different embodiment(s). Similarly, phrase "in one example" or "in some examples" does not necessarily refer to same example(s), and phrase "in another example" or "in some other examples" does not necessarily refer to different example(s). For example, a subject that is requested to be protected is intended to include, in whole or in part, exemplary embodiments or a combination of examples.

Generally, a term may be understood at least in part from its use in the context. For example, terms such as "and", "or", "and/or" as used herein may include a variety of meanings, which may depend at least in part on the context in which these terms are used. In general, if the term "or" is used to connect several objects, such as A, B, or C, it intends to mean A, B, and C (meaning included) and A, B, or C (meaning separate). If the term "and/or" is used to connect several objects, such as "A and/or B", it should be understood as only A, only B, or A and B. That is, "A and/or B" includes three kinds of relationships. In addition, the terms "one or more" or "at least one" as used herein depends at least in part on the context, may be used to describe any feature, structure, or characteristic in the singular, or may be used to describe features, structures, or a combination of characteristics in the plural.

Generally, if "at least one" is used to connect several objects, such as "at least one of A and B", it should be understood as "only A, only B, or both A and B". Similarly, based at least in part on context, terms such as "a" or "the" can be understood to mean singular or plural.

In addition, based at least in part on the context, the term "based on" or "determined by" may be understood as not necessarily intended to express a set of exclusive elements, but may allow for the existence of other elements that are not necessarily explicitly described.

In describing some embodiments, the expression "connected" and its extensions may be used. For example, the term "connected" may be used in describing some embodiments to indicate that two or more assemblies are in direct physical or electrical contact with each other. However, the term "connected" may also mean that two or more assemblies are not in direct contact with each other, but still cooperate or interact with each other. The embodiments disclosed herein are not necessarily limited to the content herein.

FIG. 1 is a block diagram of a projection display system, in accordance with some embodiments. As shown in FIG. 1, the projection display system 10 includes a control assembly 120, an optical path changing device 130, a light source assembly 140, a digital micromirror device 150 and a projection lens 160. The control assembly 120 is connected to the optical path changing device 130, the light source assembly 140, and the digital micromirror device 150.

For example, the projection display system 10 is a projector, a holographic projector, a laser projection television, or the like.

The control assembly 120 is configured to receive an image to be projected, determine a light source control signal, a digital micromirror signal and an optical path changing signal according to the image to be projected, send the light source control signal to the light source assembly 140, send the digital micromirror signal to the digital micromirror device 150 and send the optical path changing signal to the optical path changing device 130. In one example, the controller assembly 120 may be configured as a controller.

In some embodiments, the control assembly 120 includes or can be a microprocessor or a processor programmed to perform one or more of the operations and/or functions described herein. In some other embodiments, the control assembly 120 is implemented in whole or in part with specially configured hardware (for example, by one or more application-specific integrated circuits (ASIC(s)). In one example, the control assembly 120 may further include, or be connected to, a storage such as a computer-readable storage medium (e.g., a non-transitory computer-readable storage medium), which stores software, program, or codes. When the microprocessor or the processor reads and executes the software, program, or codes, the microprocessor or the processor is configured to perform one or more of the operations and/or functions described herein.

In some embodiments, as shown in FIG. 1, the projection display system 10 further includes a decoding assembly 110. The decoding assembly 110 is configured to receive or retrieve image information and decode the image information to obtain the image to be projected (i.e., the decoded image information), and send the image to be projected to the control assembly 120. In this case, the control assembly 120 is configured to receive the image to be projected from the decoding assembly 110.

The light source assembly 140 is configured to sequentially emit light of a plurality of primary colors, such as, blue light, red light and green light, to the digital micromirror device 150 based on a timing indicated by the light source control signal.

In some embodiments, the light source assembly 140 includes a laser driving module and a plurality of lasers. The light driving module is configured to receive the light source control signal and control the plurality of lasers to emit laser beams of different colors (e.g., blue, red, and green) according to the timing indicated by the light source control signal, so that the light source assembly 140 sequentially emits the light of the plurality of primary colors. The laser driving module, for example, includes one or more application specific integrated circuits, and is configured to control the plurality of lasers based on information indicated by the light source control signal.

In some other embodiments, the light source assembly 140 includes a laser driving module, a single laser, and a phosphor wheel. The laser driving module is configured to receive the light source control signal and control the laser to emit a laser beam (such as a blue laser beam) according to the light source control signal. The phosphor wheel includes different regions, such as fluorescent regions, a laser transmissive region and a laser reflecting region. The laser driving module is further configured to, according to the timing indicated by the light source control signal, control the phosphor wheel such that different regions of the phosphor wheel rotate successively and periodically to a propagation path of the laser beam. When the light beam is incident on a fluorescent region, the light beam excites fluorescent powder on the fluorescent region to generate fluorescence with a corresponding color (for example, red or green fluorescence). When the light beam is incident on the laser transmissive region or the laser reflecting region (the regions are not provided with fluorescent powder), the laser transmissive region may transmit the light beam, or the light may be reflected by the laser reflecting region. Therefore, the light source assembly 140 sequentially emits light of the plurality of primary colors.

In order to improve a color purity of the fluorescence, for example, the light source assembly 140 further includes a color filter wheel disposed behind the phosphor wheel. The color filter wheel includes color filter regions and a laser transmissive region. Each color filter region of the color filter wheel and a corresponding fluorescent region of the phosphor wheel have a same shape and a same size. The laser transmissive region of the color filter wheel and the laser transmissive region (or the laser reflecting region) of the phosphor wheel have a same shape and a same size. The laser driving module is further configured to control the color filter wheel according to the timing indicated by the light source control signal, so that the color filter wheel and the phosphor wheel rotate synchronously to filter the fluorescence, and the color purity is improved. The laser transmissive region of the color filter wheel is configured to allow a laser beam to pass through. Therefore, the light source assembly 140 sequentially emits light of the plurality of primary colors. For example, the laser emits a blue laser beam to the phosphor wheel and then to the color filter wheel, thereby obtaining the light of the plurality of primary colors.

The digital micromirror device 150 is configured to reflect at least a portion of the light of the plurality of primary colors toward the optical path changing device 130 according to the digital micromirror signal.

The digital micromirror device 150 includes or can be a spatial light modulator composed of a plurality of micromirrors (precision, micro-mirrors). In one example, the spatial light modulator is composed thousands of micromirrors, although the number of micromirrors is not limited thereto. Each micromirror corresponds to one pixel in the image to be projected. By controlling a tilting state of each micromirror, such as individually controlling a tilting angle and dwell duration of each micromirror, a gray-scale modulation of a corresponding pixel may be achieved. It will be noted that the projection display system 10 may include one or more digital micromirror devices 150. For clarity, the embodiments of the present disclosure are described by taking a projection display system including one digital micromirror device 150 as an example in FIG. 1.

The optical path changing device 130 is configured to rotate under control of the optical path changing signal, so that the light reflected by the digital micromirror device 150 to the optical path changing device 130 is directed toward the projection lens 160.

Figure 9:
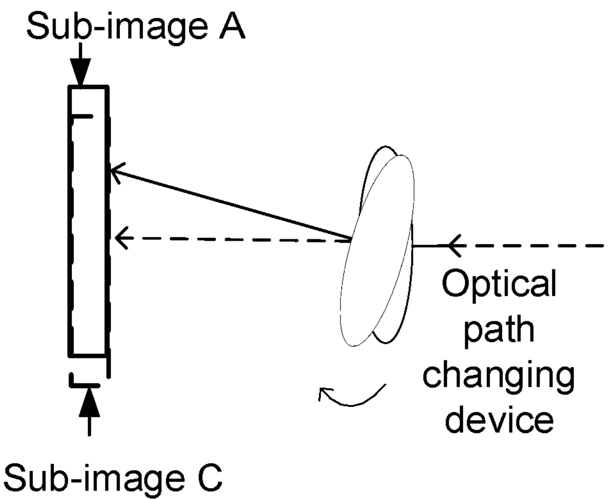
FIG. 9 is a schematic diagram of a projection of two sub-images, in accordance with some embodiments.

In some embodiments, the optical path changing device 130 includes an optical member having a plate face for changing an optical path, an application specific integrated circuit, and actuators. The optical member is, for example, a disc plate glass. The actuators are connected to the peripheral edge of the optical member. The actuators are evenly spaced, for example. The application specific integrated circuit may send a signal to an actuator, and the actuator may drive the optical member forward and backward (such as, drive a lower portion of the optical member forward, as shown in FIG. 9) based on the signal from the application specific integrated circuit, thereby changing the optical path of light entering the optical member. Of course, the optical path changing device 130 may have other structures, as long as the optical path can be changed. For example, the optical member includes or can be a mirror.

In some embodiments, the optical path changing signal includes a synchronization signal and a rotation signal. The control assembly 120 is configured to send the synchronization signal and the rotation signal to the optical path changing device 130. The synchronization signal is used for indicating a rotation moment of the optical path changing device (i.e., the optical member, for simplicity, the optical path changing device and the optical member are not distinguished). The rotation signal is used for indicating a rotation direction and a rotation angle of the optical path changing device 130. The optical path changing device 130 is configured to rotate under control of the synchronization signal and the rotation signal to transmit or reflect the light reflected to the optical path changing device 130 (i.e., the optical member) by the digital micromirror device 150 toward the projection lens 160.

In the projection display system 10 provided by the embodiments of the present disclosure, through the signal transmissions between the control assembly 10 and all of the light source assembly 140, the digital micromirror device 150 and the optical path changing device 130, the projection display system 10 may realize the projection of the image to be projected.

Figure 2:
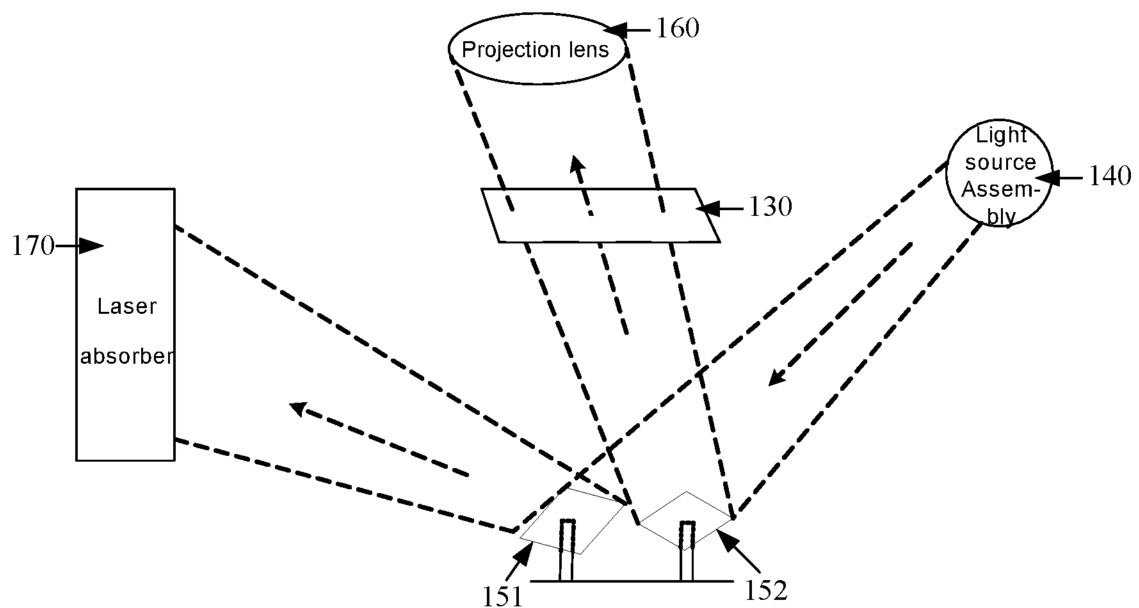
FIG. 2 is a diagram of a partial structure of a projection display system, in accordance with some embodiments.

In some embodiments, as shown in FIG. 2, the projection display system 10 further includes a light absorber 170. Through rotation of a plurality of micromirrors included in the digital micromirror device 150, effective light (i.e., light used to form a projected image) of the light of the plurality of primary colors emitted from the light source assembly 140 may be reflected to the optical path changing device 130, and ineffective light (i.e, light other than light used to form the projected image) of the light of the plurality of primary colors may be reflected to the light absorber 170. The light absorber 170 is configured to block and absorb the ineffective light to prevent the ineffective light from affecting the quality of the projected image. In some examples, a surface of the light absorber 170 facing the digital micromirror device 150 is provided with a light-absorbing material. The light-absorbing material can be referred to related technologies, and details thereof are not described herein.

For convenience of description, two micromirrors of the digital micromirror device 150 are illustrated in FIG. 2, as an example. Referring to FIG. 2, the two micromirrors include a first micromirror 151 and a second micromirror 152, and each of the first micromirror 151 and the second micromirror 152 corresponds to a corresponding pixel in the image to be projected. The light source assembly 140 sequentially emits light of a plurality of primary colors to the digital micromirror device 150, such as the first micromirror 151 and the second micromirror 152. If the first micromirror 151 is tilted to a first angle under driving of the digital micromirror signal sent by the control assembly 120, the first micromirror 151 reflects the received light of a primary color to the light absorber 170. If the second micromirror 152 is tilted to a second angle under driving of the digital micromirror signal sent by the control assembly 120, the second micromirror 152 reflects the received light of the primary color to the optical path changing device 130. The optical path changing device 130 transmits or reflects the light of the primary color to the projection lens 160 to realize the projection of the corresponding pixel. For example, the first angle is negative 12 degrees with respect to a reference plane, and the second angle is positive 12 degrees with respect to the reference plane. The amount of light entering the projection lens 160 may be determined by the tilting angle and the dwell duration of each micromirror. The light of the primary color is blue light, red light, or green light.

In a case where the resolution of the projection display system 10 is smaller than the resolution of the image to be projected, in the related art, some of pixels in the image to be projected are usually removed, and the processed image to be projected is displayed to ensure that the digital micromirror device in the projection display system may realize the projection of all the pixels remaining in the processed image to be projected.

In some embodiments of the present disclosure, the control assembly 120 is configured to determine whether the resolution of the image to be projected is greater than a preset resolution, divide the image to be projected into N sub-images if the resolution of the image to be projected is greater than the preset resolution, and determine a light source control signal, a digital micromirror signal and an optical path changing signal according to each sub-image. Herein, N is an integer greater than or equal to two.

For each sub-image, the control assembly 120 is further configured to send the light source control signal to the light source assembly 140; the light source assembly 140 is configured to emit light of a plurality of primary colors to the digital micromirror device 150 based on the timing indicated by the light source control signal; the control assembly 120 is further configured to send the digital micromirror signal to the digital micromirror device 150; the digital micromirror device 150 is configured to reflect at least a portion of the light of the plurality of primary colors to the optical path changing device 130 according to the digital micromirror signal; the control assembly 120 is further configured to send the optical path changing signal to the optical path changing device 130; and the optical path changing device 130 is configured to rotate under the control of the optical path changing signal so that the light reflected by the digital micromirror device 150 to the optical path changing device 130 is directed toward the projection lens 160. The projection lens 160 is configured to project the N sub-images at different times. The N sub-images are superimposed to form a projected image.

In this case, based on the movement (such as rotation) of the optical path changing device, the projection display system 10 may project the N sub-images constituting the image to be projected at different times. Based on the visual persistence effect of the human eyes, a time-sharing projection of the N sub-images is equivalent to a projection of an image with a pixel information carried by the image to be projected, thereby realizing a projection display of the original pixel information of the image to be projected without loss of high resolution, and overcoming the shortcomings of easily losing pixels when displaying high-resolution images in the related art.

For example, the preset resolution is the resolution of the projection display system 10, and the resolution of each sub-image is less than or equal to the resolution of the projection display system 10. In this way, for a case where the resolution of the projection display system 10 is smaller than the resolution of the image to be projected, the pixel information carried by the image to be projected may be retained during projection display, thereby reducing or even avoiding the loss of pixel information.

For example, during a display of a specified sub-image in the plurality of sub-images, the control assembly 120 determines a light source control signal, a digital micromirror signal, and an optical path changing signal corresponding to the specified sub-image according to the specified sub-image. The specified sub-image may be any one of the plurality of sub-images. The optical path changing signal includes a synchronization signal and a rotation signal. The control assembly 120 sends the light source control signal to the light source control assembly 140, so that the light source assembly 140 emits light of a plurality of primary colors to the digital micromirror device 150 based on the timing indicated by the light source control signal. The control assembly 120 sends the digital micromirror signal to the digital micromirror device 150, so that the digital micromirror device 150 reflects at least a portion of the light of the plurality of primary colors toward the optical path changing device 130 according to the digital micromirror signal. The control assembly 120 sends the synchronization signal and the rotation signal to the optical path changing device 130, so that the optical path changing device 130 transmits or reflects the light toward the projection lens 160 according to the synchronization signal and the rotation signal. Thereby, display of the specified sub-image is realized.

After the display of the specified sub-image is completed, the control assembly 120 generates a light source control signal, a digital micromirror signal, and an optical path changing signal corresponding to a next sub-image of the specified sub-image in the plurality of sub-images. The optical path changing signal includes a synchronization signal and a rotation signal. The control assembly 120 sends the light source control signal to the light source control assembly 140, so that the light source assembly 140 emits light of a plurality of primary colors to the digital micromirror device 150 based on the timing indicated by the light source control signal. The control assembly 120 sends the digital micromirror signal to the digital micromirror device

150, so that the digital micromirror device 150 reflects at least a portion of the light of the plurality of primary colors toward the optical path changing device 130 according to the digital micromirror signal. The control assembly 120 sends the synchronization signal and the rotation signal to the optical path changing device 130, so that the optical path changing device 130 transmits or reflects the light toward the projection lens 160 according to the synchronization signal and the rotation signal. Thereby, display of the next sub-image of the specified sub-image is realized. And so on, until the N sub-images are displayed, and the image to be projected is displayed.

In some embodiments, the optical path changing device 130 is configured to rotate in response to receiving the synchronization signal in the optical path changing signal, and the synchronization signal is used to control the optical path changing device 130 to rotate within a time period in which the optical path changing device 130 receives light of a target primary color in the light of the plurality of primary colors during display of each sub-image. For example, the synchronization signal is used to control the optical path changing device 130 to rotate when the optical path changing device 130 receives the light of the target primary color in the light of the primary colors during the display of each sub-image.

The light of the target primary color is, for example, blue light. Since the human eyes are not sensitive to blue, if the optical path changing device 130 rotates during a period of receiving the blue light, the human eyes do not obviously see the rotation of the optical path changing device 130, thereby further ensuring the display effect of the image.

In some examples, for any sub-image, the optical path changing device 130 rotates when receiving the light of the target primary color, and then the optical path changing device 130 remains stationary, that is, the optical path changing device 130 remains stationary in a case where the received light of the primary color is light of a primary color other than the light of the target primary color, and transmits or reflects the light of the primary color other than the light of the target primary color to the projection lens 160, and so on, until light of the plurality of primary colors is directed to the projection lens 160, thereby realizing the display of the sub-image. For example, during a display of any sub-image, the light source assembly 140 first emits the light of the target primary color, and then emits the light of primary colors other than the light of the target primary colors.

A method for the control assembly 120 to divide the image to be projected into N sub-images is exemplified below.

The control assembly 120 is configured to divide the image to be projected into a plurality of image blocks, each of which includes N pixels; and select one pixel from each image block of the plurality of image blocks to form a sub-image to obtain the N sub-images. A position of any pixel of the sub-image in a corresponding image block is the same as a position of another pixel of the sub-image in a corresponding image block. Two pixels in any two sub-images disposed in a same image block have different positions in the image block. Relative positions of pixels included in the sub-image on the sub-image are the same as relative positions of the pixels on the image to be projected.

Figure 3:
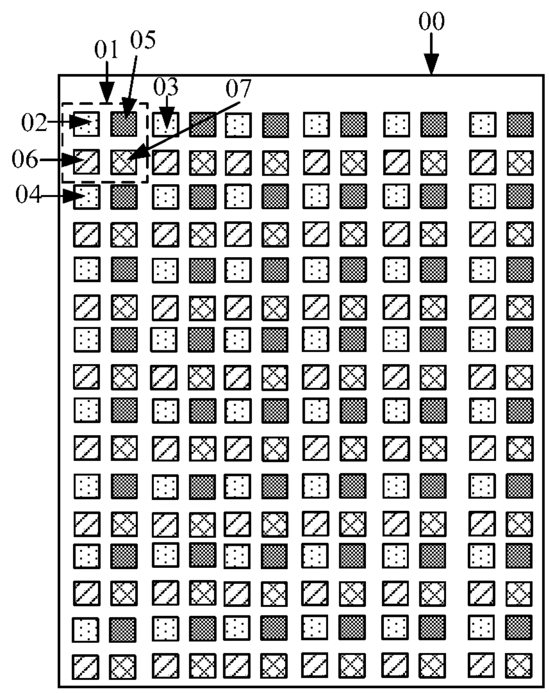
FIG. 3 is a schematic diagram of an image to be projected, in accordance with some embodiments.
Figure 4:
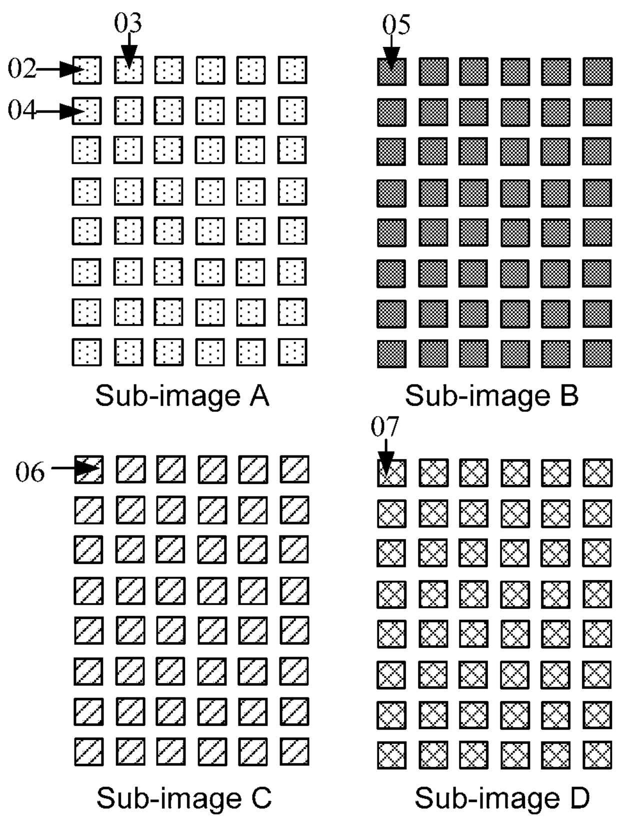
FIG. 4 is a schematic diagram showing a plurality of sub-images, in accordance with some embodiments.

For example, as shown in FIG. 3, if a resolution of the image to be projected 00 is 12×16 and N is 4, the control assembly 120 may divide the image to be projected 00 into 48 image blocks 01. Each image block 01 includes 4 pixels, and the image block 01 includes 2 pixels in a row direction and 2 pixels in a column direction. The control assembly 120 may select a pixel at a first position in each image block 01 to form a sub-image A, select a pixel at a second position in each image block 01 to form a sub-image B, select a pixel at a third position in each image block 01 to form a sub-image C, and select a pixel at a fourth position in each image block 01 to form a sub-image D, so that the sub-image A, the sub-image B, the sub-image C, and the sub-image D shown in FIG. 4 are obtained. For example, the first position is a position on which the pixel 02 in an upper left corner of the image block 01 is located, the second position is a position on which the pixel 05 in an upper right corner of the image block 01 is located, the third position is a position on which the pixel 06 in a lower left corner of the image block 01 is located, and the fourth position is a position on which the pixel 07 in a lower right corner of the image block 01 is located.

As shown in FIGS. 3 and 4, a position of a pixel 02 of the sub-image A in the image block 01 is the same as a position of a pixel 03 of the sub-image A in a corresponding image block, which are located at their respective first positions in their respective image blocks. The pixel 02 of the sub-image A and a pixel 05 of the sub-image B are located in the image block 01. The two pixels have different positions in the image block 01.

Referring to FIG. 4, taking the pixel 02, the pixel 03, and the pixel 04 in the sub-image A as an example, in the sub-image A, the pixel 03 is located directly to the right of the pixel 02, and the pixel 04 is located directly below the pixel 02. Referring to FIG. 3, in the image to be projected 00, the pixel 03 is also located to the right of the pixel 02, and the pixel 04 is also located below the pixel 02. That is, relative positions of pixels included in the sub-image A on the sub-image A are the same as relative positions of the pixels on the image to be projected 00. With regard to the pixels 05, 06 and 07, reference may be made to the pixel 02.

In some examples, each image block includes X pixels in the row direction and Y pixels in the column direction, and the product of X and Y is N.

Figure 5:
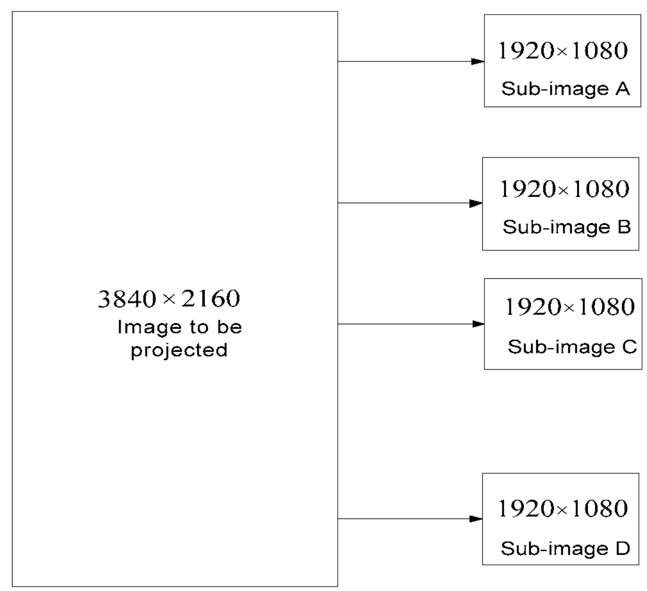
FIG. 5 is a schematic diagram of dividing an image to be projected into a plurality of sub-images, in accordance with some embodiments.

In some embodiments, the resolution of the image to be projected is 3840×2160 (3840 is a number of pixels in a horizontal direction and 2160 is a number of pixels in a vertical direction), that is, the amount of information stored in the image to be projected is 4K. The resolution of the projection display system 10 is 1920×1080, that is, the projection display system 10 displays an image with an amount of information of 1K. In this case, the digital micromirror device 150 in the projection display system 10 includes 1920×1080 micromirrors. As shown in FIG. 5, resolutions of the obtained sub-image A, sub-image B, sub-image C and sub-image D are all 1920×1080.

Figure 6:
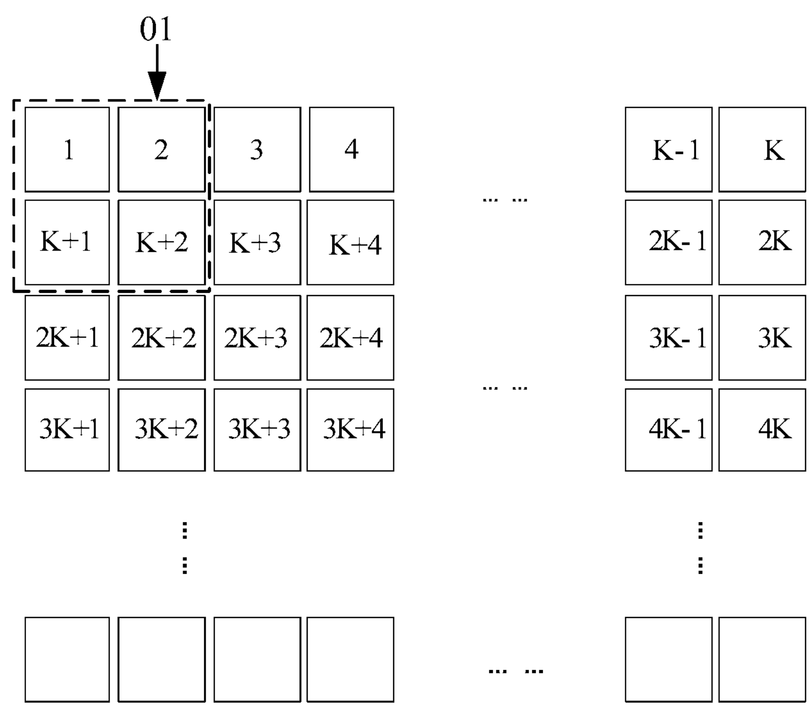
FIG. 6 is a schematic diagram of another image to be projected, in accordance with some embodiments.
Figure 7:
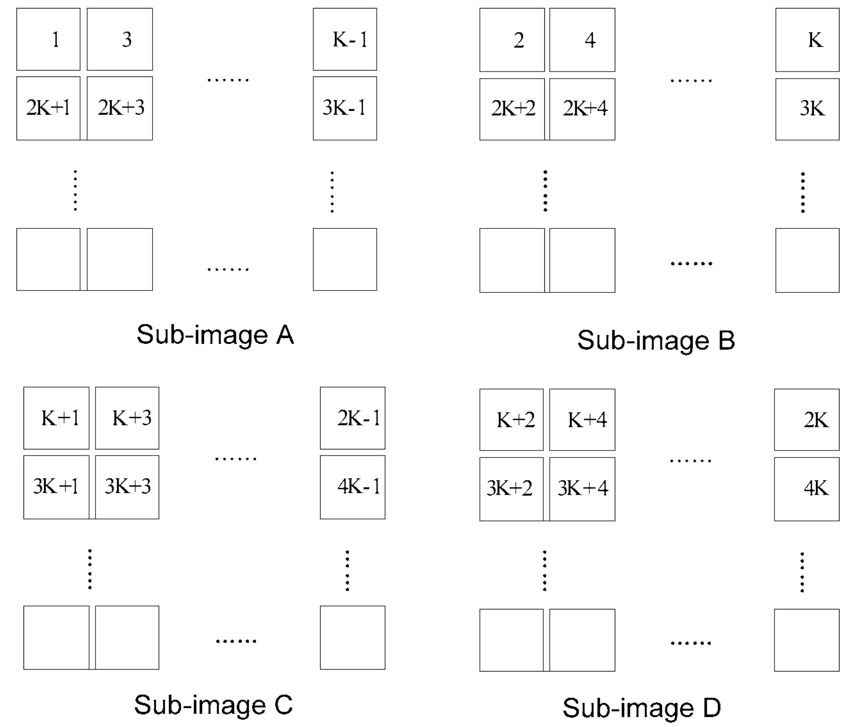
FIG. 7 is a schematic diagram showing a plurality of sub-images, in accordance with some embodiments.

In some embodiments, as shown in FIG. 6, if the image to be projected includes K columns of pixels (K is an integer greater than or equal to 6), and N is 4, the control assembly 120 may obtain the sub-image A, the sub-image B, the sub-image C and the sub-image D as shown in FIG. 7 according to the position information of the pixels in the image to be projected.

On the basis of the embodiments described above, in some examples, for a rotation signal in the optical path changing signal corresponding to the specified sub-image, the control assembly 120 determines the rotation direction and the rotation angle of the optical path changing device 130 according to the position of any pixel of the specified sub-image in a corresponding image block, and generates the rotation signal according to the rotation direction and rotation angle.

In some embodiments, the control assembly 120 is configured to pre-store a corresponding relationship between a position of any pixel of each sub-image in a corresponding image block and both the rotation direction and the rotation angle of the optical path changing device 130. In a case where the specified sub-image is displayed, the control assembly 120 may determine the rotation direction and the rotation angle of the optical path changing device 130 according to a position of any pixel of the specified sub-image in the corresponding image block and the corresponding relationship.

For example, as shown in FIGS. 6 and 7, each pixel in the sub-image A is located at the first position in a corresponding image block, each pixel in the sub-image B is located at the second position in a corresponding image block, each pixel in the sub-image C is located at the third position in a corresponding image block, and each pixel in the sub-image D is located at the fourth position in a corresponding image block.

If the specified sub-image is the sub-image A, the control assembly 120 determines that the rotation direction of the optical path changing device 130 is a first rotation direction and the rotation angle is a first rotation angle according to the first position of each pixel of the sub-image A in the corresponding image block and the pre-stored corresponding relationship. If the specified sub-image is the sub-image B, the control assembly 120 determines that the rotation direction of the optical path changing device 130 is a second rotation direction and the rotation angle is a second rotation angle according to the second position of each pixel of the sub-image B in the corresponding image block and the pre-stored corresponding relationship. If the specified sub-image is the sub-image C, the control assembly 120 determines that the rotation direction of the optical path changing device 130 is a third rotation direction and the rotation angle is a third rotation angle according to the third position of each pixel of the sub-image C in the corresponding image block and the pre-stored corresponding relationship. If the specified sub-image is the sub-image D, the control assembly 120 determines that the rotation direction of the optical path changing device 130 is a fourth rotation direction and the rotation angle is a fourth rotation angle according to the fourth position of each pixel of the sub-image D in the corresponding image block and the pre-stored corresponding relationship. For example, the control assembly 120 may drive the optical path changing device 130 to rotate in a two-dimensional direction. The first rotation direction refers to a rotation to the upper left, the second rotation direction refers to a rotation to the upper right, the third rotation direction refers to a rotation to the lower left, and the fourth rotation direction refers to a rotation to the lower right.

Next, the control assembly 120 generates the rotation signal according to the rotation direction and the rotation angle. For example, if the specified sub-image is the sub-image A, the control assembly 120 generates a rotation signal according to the first rotation direction and the first rotation angle.

It will be noted that, in the process of displaying different sub-images, the digital micromirror signals sent by the control assembly 120 to the digital micromirror device 150 are different, and the rotation signals sent to the optical path changing device 130 are also different.

Figure 8:
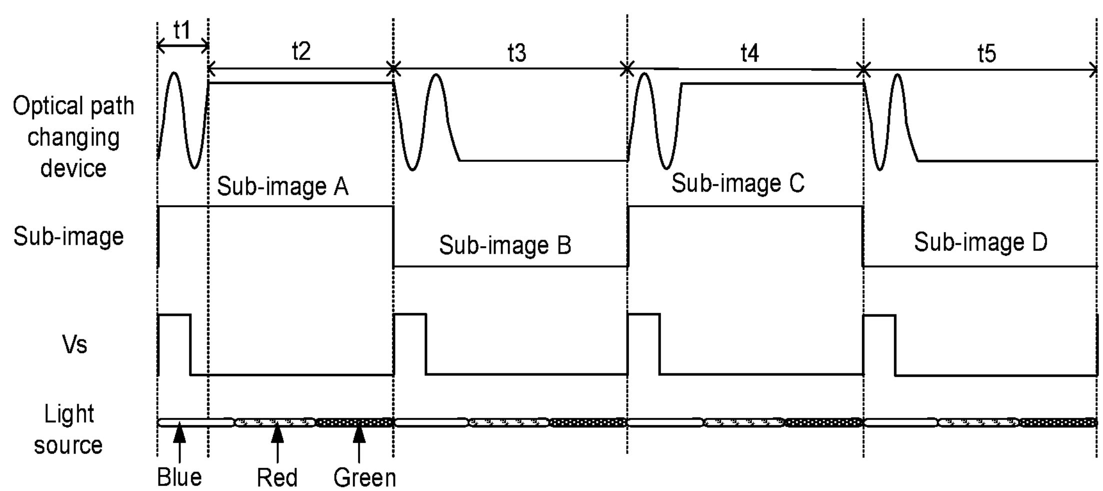
FIG. 8 is a timing diagram of displaying a plurality of sub-images, in accordance with some embodiments.

In the following, rotations of the optical path changing device 130 under control of the synchronization signals and the rotation signals during the display of the sub-image A, the sub-image B, the sub-image C and the sub-image D respectively are illustrated with reference to FIG. 8.

If the specified sub-image is the sub-image A, the control assembly 120 determines the rotation direction and the rotation angle of the optical path changing device 130 according to the position of a pixel of the sub-image A in a corresponding image block, and generates the rotation signal according to the rotation direction and the rotation angle. Then, the control assembly 120 sends a synchronization signal Vs and the rotation signal to the optical path changing device 130. The optical path changing device 130 rotates during the time period t1 under control of the synchronization signal Vs and the rotation signal, and then remains stationary during a time period t2. For example, the optical path changing device 130 reflects blue light towards the projection lens 160 after rotation. Then, the optical path changing device 130 remains stationary, and reflects the received light of primary colors other than the blue light toward the projection lens 160, and so on, until light of the plurality of primary colors are reflected toward the projection lens 160, thereby achieving display of the sub-image A.

After that, if the sub-image B is displayed, the control assembly 120 is configured to perform the above steps again, and in a time period t3, the control assembly 120 sends the synchronization signal Vs and the rotation signal to the optical path changing device 130 again, so that the optical path changing device 130 rotates under the control of the synchronization signal Vs and the rotation signal when the light of a primary color sent to the digital micromirror device 150 by the light source assembly 140 is changed into the light of the target primary color again, thereby realizing the display of the sub-image B.

If the sub-image C is displayed, the control assembly 120 is configured to perform the above steps again, and in a time period t4, the control assembly 120 sends the synchronization signal Vs and the rotation signal to the optical path changing device 130 again, so that the optical path changing device 130 rotates under the control of the synchronization signal Vs and the rotation signal when light of a primary color sent to the digital micromirror device 150 by the light source assembly 140 is changed into the light of the target primary color again, thereby realizing the display of the sub-image C.

If the sub-image D is displayed, the control assembly 120 is configured to perform the above steps again, and in a time period t5, the control assembly 120 sends the synchronization signal Vs and the rotation signal to the optical path changing device 130 again, so that the optical path changing device 130 rotates under the control of the synchronization signal Vs and the rotation signal when the light of a primary color sent to the digital micromirror device 150 by the light source assembly 140 is changed into the light of the target primary color again, thereby realizing the display of the sub-image D. The display of the image to be projected is finished.

Figure 10:
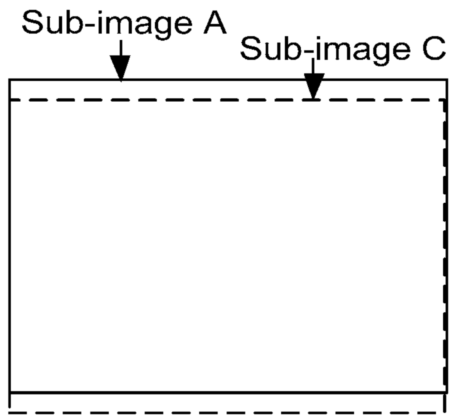
FIG. 10 is a schematic diagram of displaying two sub-images projected in FIG. 9, in accordance with some embodiments.
Figure 11:
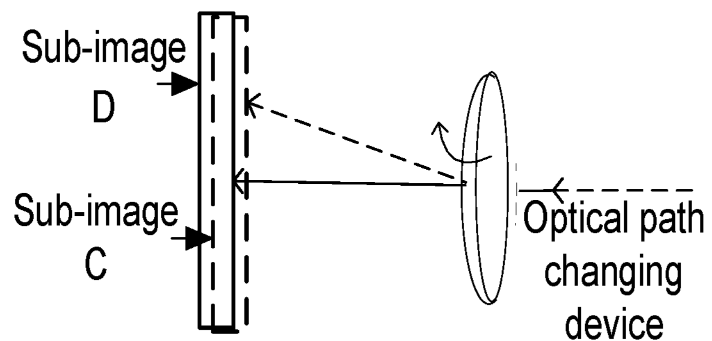
FIG. 11 is a schematic diagram of a projection of two sub-images, in accordance with some embodiments.
Figure 12:
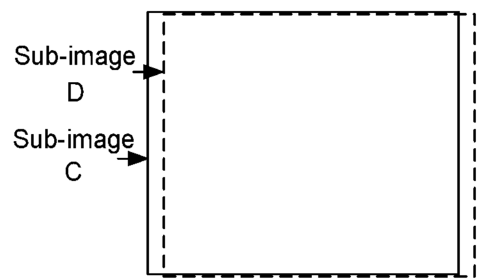
FIG. 12 is a schematic diagram of displaying two sub-images projected in FIG. 11, in accordance with some embodiments.
Figure 13:
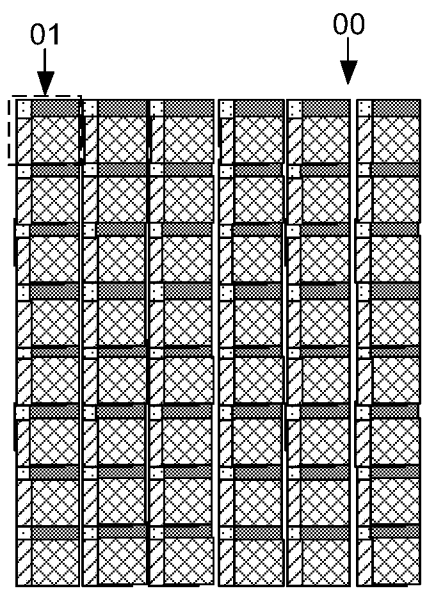
FIG. 13 is a schematic diagram showing a plurality of sub-images displayed as one image, in accordance with some embodiments.

For example, referring to FIGS. 9 and 10, in a case where the sub-image A and the sub-image C are displayed, the control assembly 120 drives the lower portion of the optical path changing device 130 to rotate forward and backward respectively, so that the later displayed sub-image C is located below the sub-image A. Referring to FIGS. 11 and 12, in a case where the sub-image B is displayed, the control assembly 120 may drive the left portion of the optical path changing device 130 to rotate forward after driving the lower portion of the optical path changing device 130 to rotate forward, so that the finally displayed sub-image B is located to the right of the sub-image A. In a case where the sub-image D is displayed, the control assembly 120 may drive the lower portion of the optical path changing device 130 to rotate backward after driving the left portion of the optical path changing device 130 to rotate forward, or drive the left portion of the optical path changing device 130 to rotate backward after driving the lower portion of the optical path changing device 130 to rotate backward, and then the displayed sub-image D is located below the sub-image B and to the right of the sub-image C. After the sub-image A, the sub-image B, the sub-image C, and the sub-image D are displayed, the image shown in FIG. 13 may be obtained.

Figure 14:
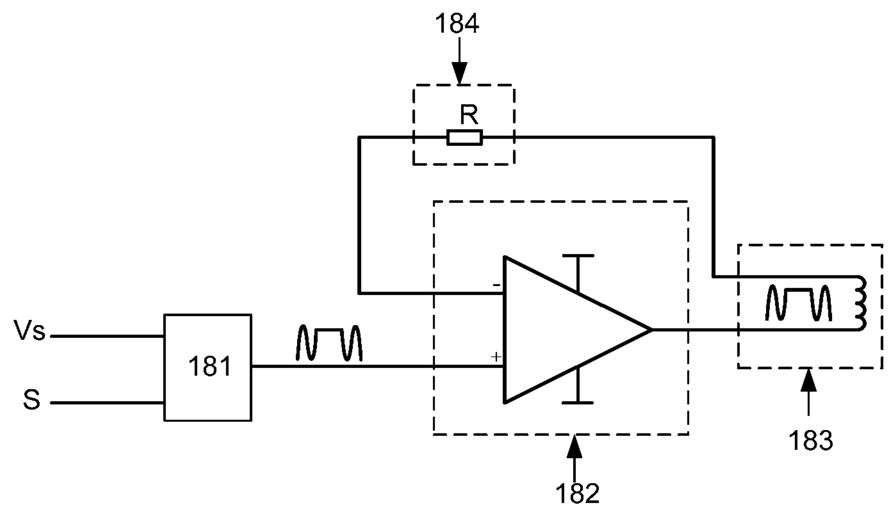
FIG. 14 is a schematic diagram of an optical path changing device driving assembly, in accordance with some embodiments.

In some embodiments, referring to FIG. 14, the projection display system 10 further includes another driving assembly for driving the optical path changing device 130, and the driving assembly includes an analog to digital converter (ADC) 181, an amplifier 182, a coil 183, and a voltage dividing sub-module 184. For example, the voltage dividing sub-module 184 includes and can be a resistor R.

In the embodiments, the control assembly 120 may send the synchronization signal Vs and a rotation signal S to the driving assembly. The synchronization signal Vs and the rotation signal S are converted into digital signals through the ADC 181, and the converted rotation signal S is output to the amplifier 182 for amplification, so as to control the vibration of the coil 183 and further control the rotation of the optical path changing device 130. The voltage dividing sub-module 184 may increase a threshold voltage input to the amplifier 182, thereby enhancing an interference resistance of the amplifier 182.

In some examples, in the process of displaying the plurality of sub-images, the decoding assembly 110 may send the decoded image to be projected to the control assembly 120 at a frequency of 60 hertz (Hz). The sub-images may be displayed at a frequency of N×60 Hz. For example, if N is 4, the sub-images may be displayed at a frequency of 240 Hz.

In summary, in the projection display system 10 provided by the embodiments of the present disclosure, since the image to be projected is divided into a plurality of sub-images, the digital micromirror device 150 may project all the pixels of the image to be projected. Compared with the digital micromirror device in the related art that may only project some of pixels in the image to be projected, the system does not lose pixel information and ensures the display effect of the displayed image. In addition, the low-resolution projection display system may also completely display all pixels of the high-resolution image to be projected, which improves the flexibility of the projection display system to display images.

Figure 15:
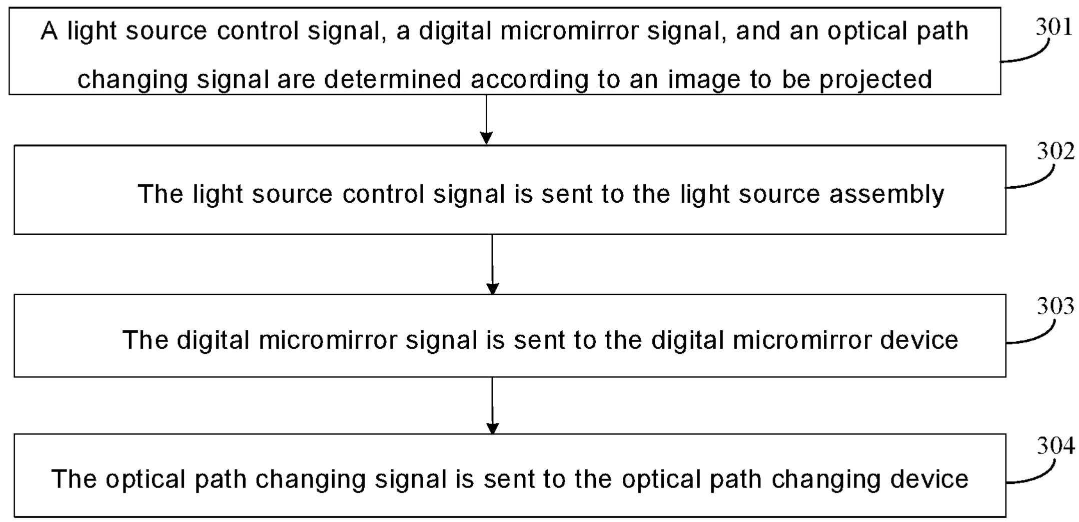
FIG. 15 is a flow diagram of a controlling method of a projection display system, in accordance with some embodiments.

FIG. 15 is a flow chart of a controlling method of a projection display system according to some embodiments of the present disclosure. The controlling method may be performed by the control assembly 120 in the projection display system 10 shown in FIG. 1. The projection display system 10 may further include an optical path changing device 130, a light source assembly 140, a digital micromirror device 150, and a projection lens 160. As shown in FIG. 15, the method may include steps 301 to 304.

In step 301, the control assembly 120 determines a light source control signal, a digital micromirror signal, and an optical path changing signal according to an image to be projected.

In some examples, as shown in FIG. 1, the projection display system 10 includes a decoding assembly 110. During the process of displaying the image to be projected, the decoding assembly 110 may decode image information to obtain the image to be projected (i.e., the decoded image) and send the image to be projected to the control assembly 120. The image to be projected may be any frame of image to be displayed in a video played by the projection display system 10. In this way, the control assembly 120 may receive the image to be projected from the decoding assembly 110.

In step 302, the control assembly 120 sends the light source control signal to the light source assembly 140. The light source control signal is used to control the light source assembly 140 to sequentially emit light of a plurality of primary colors to the digital micromirror device 150 according to a timing indicated by the light source control signal.

For example, the light source control signal is a control signal corresponding to a specified sub-image in a plurality of sub-images obtained by dividing the image to be projected. The specified sub-image is any sub-image among the plurality of sub-images.

In step 303, the control assembly 120 sends the digital micromirror signal to the digital micromirror device 150. The digital micromirror signal is used to control a plurality of micromirrors in the digital micromirror device 150 to rotate, so as to reflect effective light for imaging among the light of the plurality of primary colors to the optical path changing device 130.

In step 304, the control assembly 120 sends the optical path changing signal to the optical path changing device 130. The optical path changing signal is used to control the optical path changing device 130 to rotate.

For example, the optical path changing signal includes a synchronization signal and a rotation signal. The synchronization signal is used for indicating a rotation moment of the optical path changing device 130, and the rotation signal is used for indicating a rotation direction and a rotation angle of the optical path changing device 130. The optical path changing device 130 rotates under control of the synchronization signal and the rotation signal to transmit or reflect the received light of a primary color to the projection lens 160.

It will be noted that the sequence of steps of the controlling method of the projection display system in the embodiments of the present disclosure is not limited to the sequence of above 301 to 304. For example, the controlling method of the projection display system performed, for example, by the control assembly 120, may also include: first, determining the light source control signal according to the image to be projected, and sending the light source control signal to the light source assembly 140; second, determining the digital micromirror signal according to the image to be projected, and sending the digital micromirror signal to the digital micromirror device 150; finally, determining the optical path changing signal according to the image to be projected, and sending the optical path changing signal to the optical path changing device 130.

Figure 16:
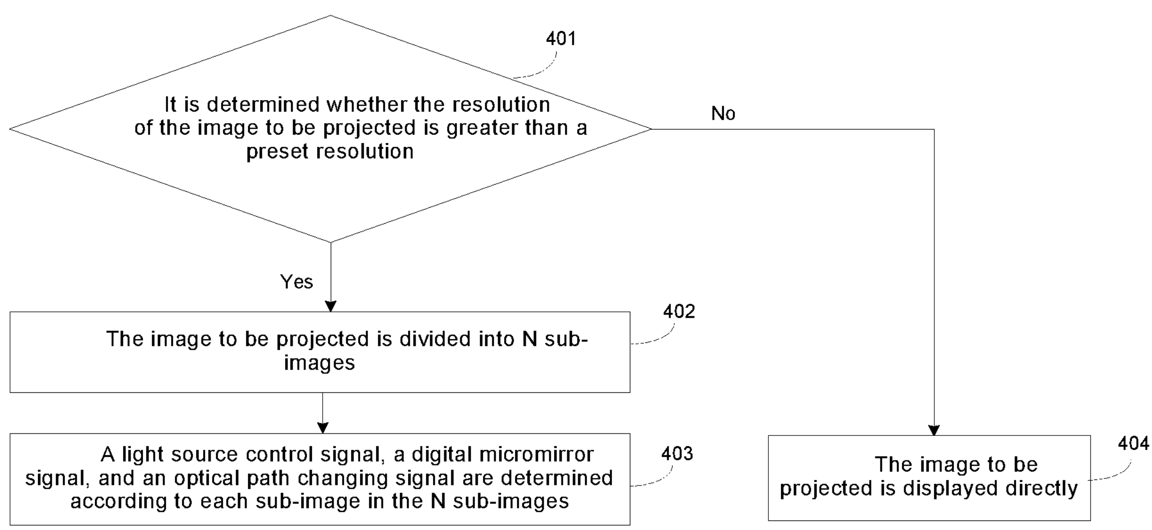
FIG. 16 is a flow diagram of another controlling method of a projection display system, in accordance with some embodiments.

In some embodiments, referring to FIG. 16, the step 301, in which the light source control signal, the digital micromirror signal, and the optical path changing signal are determined according to the image to be projected, includes steps 401 to 403.

In step 401, the control assembly 120 determines whether the resolution of the image to be projected is greater than a preset resolution, and if so, step 402, dividing the image to be projected into N sub-images, is performed, wherein N is an integer greater than or equal to 2.

For example, the preset resolution is a resolution of the projection display system 10, and a resolution of each sub-image is less than or equal to the resolution of the projection display system 10. For example, after receiving the image to be projected, the control assembly 120 obtains the resolution of the image to be projected, and determines whether the resolution of the image to be projected is greater than the resolution of the projection display system 10. If the control assembly 120 determines that the resolution of the image to be projected is greater than the resolution of the projection display system 10, the control assembly 120 divides the image to be projected into N sub-images to ensure that each micromirror of the digital micromirror device 150 in the projection display system 10 may project a pixel in each sub-image.

If the control assembly 120 determines that the resolution of the image to be projected is not greater than (e.g., less than or equal to) the resolution of the projection display system 10 (e.g., No in step 401), the image to be projected may be displayed directly based on step 404.

In some embodiments, the step 402 includes: dividing the image to be projected into a plurality of image blocks, and selecting one pixel from each image block of the plurality of image blocks to form a sub-image to obtain N sub-images. A position of any pixel of the sub-image in a corresponding image block is the same as a position of another pixel of the sub-image in a corresponding image block. That is, in the N sub-images, each sub-image is composed of pixels at the same position in a plurality of image blocks into which the image to be projected is divided. In addition, two pixels of any two sub-images in a same image block have different positions in the image block. Relative positions of pixels included in the sub-image on the sub-image are the same as relative positions of the pixels on the image to be projected. Each image block includes N pixels. For example, each image block includes X pixels in the row direction and Y pixels in the column direction, and the product of X and Y is N.

In step 403, the control assembly 120 determines the light source control signal, the digital micromirror signal, and the optical path changing signal according to each sub-image of the N sub-images.

Since the image to be projected is divided into a plurality of sub-images, the digital micromirror device may project all the pixels of the image to be projected. Compared with the digital micromirror device in the related art that may only project some of pixels in the image to be projected, the system does not lose pixel information and ensures the display effect of the displayed image. In addition, the low-resolution projection display system may also completely display all pixels of the high-resolution image to be projected, which improves the flexibility of the projection display system to display images.

Figure 17:
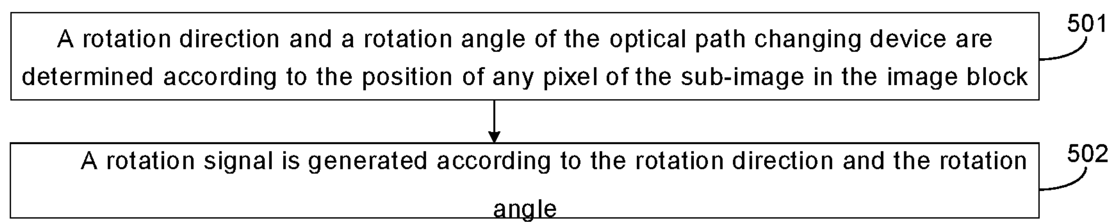
FIG. 17 is a flow diagram of yet another controlling method of a projection display system, in accordance with some embodiments.

In some embodiments, the optical path changing signal includes a synchronization signal and a rotation signal. Referring to FIG. 17, the controlling method further includes steps 501 and 502.

In step 501, a rotation direction and a rotation angle of the optical path changing device are determined according to a position of each pixel of the sub-image in the image block.

For example, the control assembly 120 pre-stores, in a storage such as a transitory computer readable medium or a non-transitory computer readable medium, a corresponding relationship between the position of any pixel of each sub-image in a corresponding image block and both the rotation direction and the rotation angle of the optical path changing device. In a case where the specified sub-image is displayed, the control assembly 120 may determine the rotation direction and the rotation angle of the optical path changing device according to the position of any pixel of the specified sub-image in the image block and the corresponding relationship.

In step 502, the control assembly 120 generates a rotation signal according to the rotation direction and the rotation angle.

For example, the control assembly 120 generates the rotation signal according to the rotation direction and the rotation angle. The control assembly 120 sends the synchronization signal and the rotation signal to the optical path changing device 130 after generating the rotation signal, so that the optical path changing device 130 rotates under the control of the synchronization signal and the rotation signal and reflect the received light of a primary color to the projection lens 160. The synchronization signal is used for indicating a rotation moment of the optical path changing device 130, and the rotation signal is used for indicating the rotation direction and the rotation angle of the optical path changing device 130.

In some examples, the synchronization signal is used to control the optical path changing device 130 to rotate during a period in which the optical path changing device 130 receives the light of the target primary color in the light of the plurality of primary colors. For example, the synchronization signal is used to control the optical path changing device 130 to rotate when the light of a primary color emitted by the light source assembly 140 is changed into the light of the target primary color. The light of the target primary color is, for example, blue light. Since the human eyes are not sensitive to blue, when the light of the primary color travelling to the digital micromirror device is blue light, the optical path changing device 130 is driven to rotate, and the human eyes do not obviously see the rotation of the optical path changing device 130, which further ensures the display effect of images.

In some examples, the control assembly 120 may send the synchronization signal and the rotation signal to the optical path changing device 130, so that the optical path changing device 130 rotates under control of the rotation signal when the light of a primary color sent from the light source assembly 140 to the digital micromirror device 150 is changed into the light of the target primary color, and then the optical path changing device 130 remains stationary. For example, the optical path changing device 130 reflects the received light of the target primary color to the projection lens 160 after rotation. Thereafter, when the light of the primary color sent to the digital micromirror device 150 by the light source assembly 140 becomes light of primary colors other than the light of the target primary color, the optical path changing device 130 remains stationary, and transmits or reflects the light of the primary colors other than the light of the target primary color toward the projection lens 160, and so on until the light of the plurality of primary colors is transmitted through or reflected toward the projection lens 160 to achieve display of the specified sub-image.

Thereafter, the control assembly 120 performs the above steps again to display a next sub-image of the specified sub-image in the plurality of sub-images, and so on until the display of the N sub-images are completed, and the display of the image to be projected is finished.

It will be noted that the sequence of the steps of the controlling method of the projection display system provided by the embodiments of the present disclosure may be appropriately adjusted and the steps may be deleted according to circumstances. Any person skilled in the art could readily conceive of changes or replacements within the technical scope of the present disclosure, which shall all be included in the protection scope of the present disclosure, and will not be described in detail herein.

Some embodiments of the present disclosure provide a control device for projecting an image. The control device may be the control assembly 120 in the projection display system 10 shown in FIG. 1. The projection display system 10 may include the decoding assembly 110, the optical path changing device 130, the light source assembly 140, the digital micromirror device 150, and the projection lens 160 shown in FIG. 1 The structure and function of the control device may be described with reference to the control assembly 120 in the above embodiments and will not be described in detail herein.

The beneficial effects of the control device of the projection display system provided by the embodiments of the present disclosure are the same as the beneficial effects of the control assembly described in any of the foregoing embodiments, and will not be described in detail herein.

Figure 18:
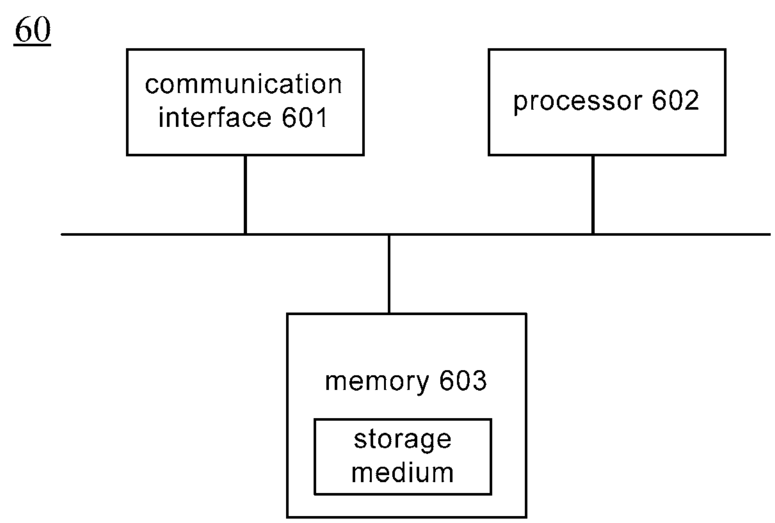
FIG. 18 is a schematic diagram of a projection display device, in accordance with some embodiments.

Some embodiments of the present disclosure provide a projection display device. As shown in FIG. 18, the projection display device 60 includes a communication interface 601 and a processor 602. The communication interface 601 is configured to receive an image to be projected. The processor 602 is configured to implement one or more steps in the controlling method of the projection display system as in any of the above embodiments.

For example, the above-mentioned projection display device is a projector, a holographic projector, a light projection television, or the like.

In some embodiments, as shown in FIG. 18, the projection display device 60 further includes a memory 603 that stores computer program instructions. The memory 603 is, for example, a computer-readable storage medium. In some examples, the memory 603 also pre-stores a corresponding relationship between the position of any pixel included in each sub-image in a corresponding image block and both the rotation direction and the rotation angle of the optical path changing device. In a case where the specified sub-image is displayed, the control assembly 120 may determine the rotation direction and the rotation angle of the optical path changing device according to the position of each pixel of the specified sub-image in the corresponding image block and the corresponding relationship.

Some embodiments of the present disclosure provide a computer-readable storage medium (e.g., a non-transitory computer-readable storage medium). The computer-readable storage medium stores computer program instructions that, when executed by a computer, cause the computer to perform one or more steps in the controlling method of the projection display system as in any of the embodiments described above.

For example, the computer-readable storage medium described above may include, but is not limited to: a magnetic storage device (e.g., a hard disk, a floppy disk, or a magnetic tape, etc.), a compact disk (CD) a digital versatile disk (DVD), a smart card and a flash memory device (e.g., an erasable programmable read-only memory (EPROM), a card, a stick or a key drive, etc.). The computer-readable storage mediums described in the embodiments of the present disclosure may represent one or more devices and/or other machine-readable storage mediums used to store information. The term "machine-readable storage medium" may include, but is not limited to, wireless channels and a plurality of other mediums capable of storing, containing, and/or carrying instruction(s) and/or data.

Some embodiments of the present disclosure provide a computer program product. The computer program product includes computer program instructions that, when run on a computer, cause the computer to perform one or more steps in the controlling method of the projection display system described in any of the embodiments described above.

Some embodiments of the present disclosure provide a computer program. When the computer program is executed on a computer, the computer program causes the computer to execute one or more steps in the controlling method of the projection display system described in any of the embodiments described above.

The beneficial effects of the projection display device, the computer-readable storage medium, the computer program product, and the computer program are the same as the beneficial effects of the controlling method of the projection display system in any of the embodiments described above, and will not be described in detail herein.

The above descriptions are merely exemplary implementation of the present disclosure and are not intended to limit the present disclosure. Any modifications, equivalent replacement, improvements made within the spirit and principles of the present disclosure shall be included in the protection scope of the present disclosure.

What is claimed is:

1. A projection display system, comprising:

a control assembly, a light source assembly, a digital micromirror device, an optical path changing device and a projection lens, wherein the control assembly is configured to:

determine whether a resolution of an image to be projected is greater than a preset resolution, and divide the image to be projected in such a way into N sub-images in response to a determination that the resolution of the image to be projected is greater than the preset resolution:

divide the image to be projected into a plurality of image blocks, each image block including N pixels; and select one pixel from each image block of the plurality of image blocks to form a sub-image to obtain the N sub-images, wherein a position of a pixel in the sub-image in a corresponding image block is the same as a position of another pixel in the sub-image in another corresponding image block; two pixels in any two sub-images disposed in a same image block have different positions in the same image block; and relative positions of pixels included in the sub-image on the sub-image are the same as relative positions of the pixels on the image to be projected;

wherein N is an integer greater than or equal to 2;

for each sub-image:

the control assembly is further configured to determine a light source control signal, a digital micromirror signal, and an optical path changing signal according to the sub-image, send the light source control signal to the light source assembly, send the digital micromirror signal to the digital micromirror device and send the optical path changing signal to the optical path changing device wherein, the optical path changing signal includes a synchronization signal including information indicating a rotation moment of the optical path changing device, and a rotation signal including information indicating a rotation direction and a rotation angle of the optical path changing device;

the light source assembly is configured to sequentially emit light of a plurality of primary colors to the digital micromirror device based on a timing indicated by the light source control signal;

the digital micromirror device is configured to reflect at least a portion of the light of the plurality of primary colors toward the optical path changing device according to the digital micromirror signal; and the optical path changing device is configured to rotate under control of the optical path changing signal, so that light reflected by the digital micromirror device to the optical path changing device is directed toward the projection lens; and the projection lens is configured to project the N sub-images at different times.

2. The projection display system according to claim 1, wherein the preset resolution is a resolution of the projection display system, and a resolution of each sub-image is less than or equal to the resolution of the projection display system.

3. The projection display system according to claim 1, wherein in response to a synchronization signal included in the optical path changing signal received from the control assembly, the optical path changing device is configured to rotate within a time period in which the optical path changing device receives light of a target primary color in the light of the plurality of primary colors during display of each sub-image by the projection display system.

4. The projection display system according to claim 3, wherein the light of the target primary color is blue light.

5. The projection display system according to claim 1, wherein the control assembly is configured to:

determine a rotation direction and a rotation angle of the optical path changing device according to a position of any pixel of the sub-image in a corresponding image block; and generate a rotation signal according to the rotation direction and the rotation angle.

6. The projection display system according to claim 5, wherein the control assembly is configured to:

pre-store a corresponding relationship between a position of any pixel of the sub-image in a corresponding image block and both the rotation direction and the rotation angle of the optical path changing device;

determine the rotation direction and the rotation angle of the optical path changing device according to a position of any pixel of the sub-image in a corresponding image block and the corresponding relationship; and generate the rotation signal according to the rotation direction and the rotation angle.

7. The projection display system according to claim 1, further comprising a decoding assembly, wherein the decoding assembly is configured to decode image information to obtain the image to be projected; and the control assembly is configured to receive the image to be projected from the decoding assembly.

8. A controlling method of a projection display system comprising a light source assembly, a digital micromirror device, an optical path changing device, a control assembly and a projection lens, the control method comprising:

determining, by the control assembly, whether a resolution of an image to be projected is greater than a preset resolution;

dividing, by the control assembly, the image to be projected in such a way into N sub-images in response to a determination that the resolution of the image to be projected is greater than the preset resolution;

dividing the image to be projected into a plurality of image blocks, each image block including N pixels; and select one pixel from each image block of the plurality of image blocks to form a sub-image to obtain the N sub-images, wherein a position of a pixel in the sub-image in a corresponding image block is the same as a position of another pixel in the sub-image in another corresponding image block; two pixels in any two sub-images disposed in a same image block have different positions in the same image block; and relative positions of pixels included in the sub-image on the sub-image are the same as relative positions of the pixels on the image to be projected;

wherein N is an integer greater than or equal to 2; and for each sub-image:

determining, by the control assembly, a light source control signal, a digital micromirror signal, and an optical path changing signal according to the sub-image, wherein the optical path changing signal includes a synchronization signal including information indicating a rotation moment of the optical path changing device, and a rotation signal including information indicating a rotation direction and a rotation angle of the optical path changing device;

sending, by the control assembly, the light source control signal to the light source assembly to control a timing of the light source assembly to emit light of a plurality of primary colors to the digital micromirror device;

sending, by the control assembly, the digital micromirror signal to the digital micromirror device to control a plurality of micromirrors in the digital micromirror device to rotate, so that the digital micromirror device reflects at least a portion of the light of the plurality of primary colors toward the optical path changing device, and sending, by the control assembly, the optical path changing signal to the optical path changing device to control the optical path changing device to rotate, so that the optical path changing device directs light reflected by the digital micromirror device toward the projection lens.

9. The controlling method according to claim 8, wherein the preset resolution is a resolution of the projection display system, and a resolution of each sub-image is less than or equal to the resolution of the projection display system.

10. The controlling method according to claim 8, further comprising: controlling, by the control assembly, based on the synchronization signal included in the optical path changing signal, the optical path changing device to rotate within a time period in which the optical path changing device receives light of a target primary color in the light of the plurality of primary colors during display of each sub-image by the projection display system.

11. The controlling method according to claim 10, wherein the light of the target primary color is blue light.

12. The controlling method according to claim 8, wherein determining, by the control assembly, the optical path changing signal according to the image to be projected, includes:

determining, by the control assembly, a rotation direction and a rotation angle of the optical path changing device according to a position of each pixel of the sub-image in a corresponding image block; and generating, by the control assembly, the rotation signal according to the rotation direction and the rotation angle.

13. The controlling method according to claim 12, wherein determining, by the control assembly, the rotation direction and the rotation angle of the optical path changing device according to the position of each pixel of the sub-image in the corresponding image block, includes:

pre-storing, by the control assembly, a corresponding relationship between a position of any pixel of the sub-image in a corresponding image block and both the rotation direction and the rotation angle of the optical path changing device; and determining, by the control assembly, the rotation direction and the rotation angle of the optical path changing device according to a position of any pixel of the sub-image in a corresponding image block and the corresponding relationship.

14. The controlling method according to claim 8, further comprising:

receiving, by the control assembly, an image to be projected from a decoding assembly.

15. A projection display device, comprising:

a communication interface configured to receive an image to be projected; and a processor coupled to the communication interface, and configured to perform the controlling method of the projection display system according to claim 8.

16. A non-transitory computer-readable storage medium storing computer program instructions that, when executed by a computer, cause the computer to perform the controlling method of the projection display system according to claim 8.

* * * * *